3,003,989
PIGMENTATION OF MOLDED GOODS AND CAST SHEETS WITH ANTHRAQUINONE DYESTUFFS

Klaus Ehrhardt and Fritz Kehrer, Basel, and Wolfgang Schoenauer, Riehen, Switzerland, assignors to Sandoz A.G., Basel, Switzerland
No Drawing. Filed July 28, 1958, Ser. No. 751,119
Claims priority, application Switzerland Aug. 16, 1957
6 Claims. (Cl. 260—37)

This invention relates to a process for pigmenting molded goods, cast sheets and filaments of synthetic polymers or copolymers or of polycondensates in which there is used an anthraquinone dyestuff of the general formula

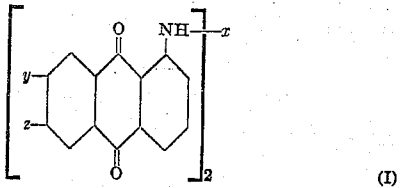

wherein $x$ stands for the divalent radical of benzene-1.4-dicarboxylic acid or of 1.1'-azobenzene- or 1.1'-azoxybenzene-4.4'-dicarboxylic acid or of an ethylene-1.2-dicarboxylic acid which may be substituted by chlorine or methyl,
$y$ for hydrogen, fluorine, chlorine or bromine, and
$z$ for hydrogen, fluorine, chlorine or bromine.

The anthraquinone dyestuffs of Formula I are highly suitable for the mass pigmentation of molded articles and films of polymeric substances, e.g. polyvinyl chloride, polyethylene, polystyrene, polyacrylonitrile and acrylonitrile copolymers, and of polycondensates, e.g. polyamides, polyesters. They are ready for immediate use, being in very finely divided state with an average particle size of $1\mu$, and according to the type of application they can be directly mixed with the material to be dyed, e.g. a molding powder of the polyamide or polystyrene type, or added after the polymer has been dissolved in a solvent or wetted out with a plasticizer. Owing to their high melting point and their outstanding resistance to heat, the anthraquinone dyestuffs of Formula I are also suitable for dyeing fiber-forming polyamides and polyesters in the melt prior to spinning of the filament.

The pigmentations obtained in the aforementioned materials possess good to very good fastness to light, migration, water, washing, cross dyeing, chlorine in acid and alkaline medium, chlorite, sublimation, oxalic acid, dry cleaning, gas fumes, crocking, pressing, peroxide bleaching, blind vatting and perspiration, along with good resistance to heat and hydrosulfite.

In the following examples the parts and percentages are by weight and the temperatures in degrees centigrade. The anthraquinone dyestuffs used in the examples are set out in the following table. They correspond to the formula

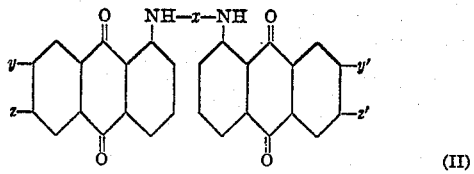

In the table the meanings of the symbols $x$, $y$, $y'$, $z$ and $z'$ are given.

TABLE

| Example | $y$ | $y'$ | $z$ | $z'$ | $x$ = Radical of— |
|---|---|---|---|---|---|
| A | H | H | H | H | Benzene-1.4-dicarboxylic acid. |
| B | Cl | Cl | H | H | Do. |
| C | Cl | Cl | Cl | Cl | Do. |
| D | H | H | Cl | Cl | Do. |
| E | H | H | Br | Br | Do. |
| F | H | H | F | F | Do. |
| G | H | H | F | F | Fumaric acid. |
| H | H | H | Br | Br | Do. |
| J | H | H | Cl | Cl | Do. |
| K | H | Cl | H | Cl | Do. |
| L | Cl | H | Cl | H | Do. |
| M | Cl | Cl | Cl | Cl | Do. |
| N | H | H | H | H | 1.1'-Azobenzene-4.4'-dicarboxylic acid. |
| O | H | H | F | F | Do. |
| P | H | H | Br | Br | Do. |
| Q | Cl | H | Cl | H | Do. |
| R | Cl | H | H | H | Do. |
| S | Cl | Cl | Cl | Cl | Do. |
| T | H | H | Cl | Cl | Do. |
| U | H | H | H | H | Methylfumaric acid. |
| V | Cl | Cl | Cl | Cl | Do. |
| W | Cl | Cl | Cl | Cl | Chlorofumaric acid. |
| X | H | H | H | H | Do. |
| Y | H | H | H | H | Dichloromaleic acid. |
| Z | H | H | Cl | Cl | Do. |
| AA | H | H | H | H | Fumaric acid. |

Example 1

0.1 part of the anthraquinone dyestuff (N) is wetted out with dioctyl phthalate and mixed with 100 parts of polyvinyl chloride with a suitable content of a plasticizer. The colored mass is gelatinized with friction on a roller mill for 10 minutes at about 140–150°, and the film drawn off parallel to the rollers or diagonally with slight friction. The yellow film is outstandingly fast to light and migration. The anthraquinone dyestuff (N) can be replaced by any one of the dyestuffs listed in the table. The properties of the obtained film are in every case excellent.

Example 2

A solution of 400 parts of polyethylene in 600 parts of xylene is pigmented with 4 parts of the anthraquinone dyestuff (S). The solution is pumped into a spinning machine and extruded through orifices of 0.5 mm. diameter into a mixture of butyl alcohol and butyl phthalate. The precipitated yellow filaments are washed in petroleum ether and dried in warm air. They possess excellent light and washing fastness. With the other dyestuffs of the table filaments with excellent fastness properties are also obtained.

Example 3

1 part of the anthraquinone dyestuff (O) is dispersed in a solution of 150 parts of polyvinyl chloride in 849 parts of cyclohexanone at 80°. The warm mixture is spun into a precipitating bath of 500 parts of cyclohexanone and 9500 parts of 2-ethylhexanone at 30°. The yellow filaments are wound, dried under tension, and orientated. Instead of the anthraquinone dyestuff (O) any one of the dyestuffs listed in the table can be employed with equal success.

Example 4

2 parts of a mixture of the anthraquinone dyestuffs (N) and (S) are dispersed in a solution of 280 parts of post-chlorinated polyvinyl chloride, 10 parts of diethyl sulfide and 708 parts of acetone at 40°. The dispersion is pumped into the spinning unit and spun, using water as precipitant. The yellow filaments are orientated and dried at 40° to 70°. Mixtures of the other dyestuffs mentioned in the table or the single dyestuffs also yield excellent results.

Example 5

A mixture of 1 part of the anthraquinone dyestuff (T) 199 parts of a copolymer of 60.1% of vinyl chloride and 39.9% of acrylonitrile, and 800 parts of acetone is mixed for 4 hours at 50°. The pigmented solution is spun into a precipitating bath of water. The filaments are then orientated and heat-set in boiling water; they are of yellow shade and possess good fastness properties. The replacement of the anthraquinone dyestuff by any one of the dyestuffs set out in the table leads to yellow filaments of equally good fastness properties.

Example 6

1 part of the anthraquinone dyestuff (P) is added to a solution at 100° of 165 parts of polyacrylonitrile in 834 parts of dimethylformamide. The mass is spun from a spinning machine in the same way as viscose rayon, precipitated with water and orientated in a water bath at 90°. The yellow filaments have good fastness properties. Excellent results are also obtained with the other anthraquinone dyestuffs of the table used alone or in mixtures with each other.

Example 7

1 part of the anthraquinone dyestuff (AA) and 179 parts of polyacrylonitrile are stirred into 820 parts of dimethylformamide at 100°. The paste is ejected from the spinneret of the spinning machine into glycerine at 140°. The filament is wound and stretched, washed free from glycerine and dried. It is of yellow shade and of good all-round fastness. The anthraquinone dyestuffs (A) to (Z) also permit to obtain filaments of good fastness properties.

Example 8

25 parts of the anthraquinone dyestuff (M) are mixed with 5,000 parts of Rilsan polyamide fiber and the mixture melted in a nitrogen atmosphere at 230°, the normal method used for fiber preparation. The mass, which is of thick liquid consistency, is spun to give yellow filaments having good fastness properties. The following anthraquinone dyestuffs (A), (B), (C), (N), (O), (S), (T), (U) and (AA) yield filaments possessing the same fastness properties.

Example 9

25 parts of the anthraquinone dyestuff (N) are mixed with 2,500 parts of nylon 66 and the mixture melted in the normal way in a nitrogen atmosphere at about 285°. The thick liquid mass is spun into yellow filaments which are of good fastness and can be orientated and/or crimped and shrink-proofed by suitable heat treatments. With the anthraquinone dyestuffs (A) and (AA) yellow filaments with excellent fastness properties are also obtained. Nylon 6 can be dyed in the melt with the dyestuffs (A), (N) and (AA) in the same manner as described for nylon 66.

Example 10

25 parts of the anthraquinone dyestuff (Y) are mixed with 5,000 parts of the condensate of terephthalic acid and glycol or of the dimethyl ester thereof and glycol. The mixture is melted by the normal method employing a nitrogen atmosphere at about 280°. The thick liquid mass is spun into yellow filaments of good all-round fastness. With the anthraquinone dyestuffs listed in Example 8 similarly good results are obtained.

Example 11

1 part of the anthraquinone dyestuff (U) is mixed with 300 parts of polyethylene and extruded as filament by the normal method (cf. Ullmann's Enzyklopädie der technischen Chemie. 2nd edition, vol. 7, pp. 272, 291 et seq.). Yellow filaments or bristles are obtained. Polystyrene can be mass pigmented with the same dyestuff on similar lines using any one of the anthraquinone dyestuffs set out in the table.

Example 12

0.2 part of the anthraquinone dyestuff (N) is mixed with 100 parts of polyethylene molding powder. The mixture can either be directly injected at 220–280° into an injection molding machine or extruded as rods or rolled into films, the rods or films then being powdered and molded in an injection molding machine if desired. The molded goods are yellow and show very good fastness to light and migration. The molded goods pigmented with any one of the anthraquinone dyestuffs of the table also possess very good light and migration fastness.

Example 13

100 parts of polystyrene molding powder are pigmented with 0.2 part of any one of the anthraquinone dyestuffs listed in the table and processed at 220–300° in the manner described in Example 12. Yellow molded articles are obtained which have very good fastness to light and migration.

Example 14

1 part of the anthraquinone dyestuff (S) is ground with 1.5 parts of dioctyl phthalate on a three-roller mill and the paste stirred into 100 parts of a standard polyvinyl chloride-plasticizer paste. Alternatively, the dry pigment can be added to the paste which can then be ground if desired. A textile fabric is coated with the yellow paste which is subsequently gelatinized at high temperature and if desired embossed. The yellow imitation leather obtained in this way is very fast to light, migration and rubbing. In place of the anthraquinone dyestuffs (S) one of the anthraquinone dyestuffs of the table can be used with equal success.

Having thus disclosed the invention what we claim is:

1. A process for mass pigmenting filaments, molded goods and cast sheets made with a material selected from the group consisting of synthetic polymers, copolymers and polycondensates wherein an anthraquinone dyestuff of the formula

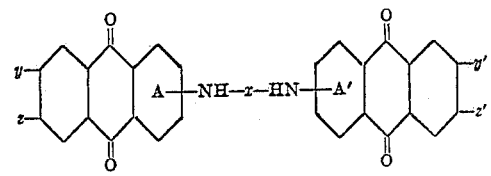

wherein $x$ represents the divalent radical of a member selected from the group consisting of benzene-1.4-dicarboxylic acid, 1.1'-azobenzene-4.4'-dicarboxylic acid, 1.1'-azoxybenzene-4.4'-dicarboxylic acid, ethylene-1.2-dicarboxylic acid, 1-chloroethylene-1.2-dicarboxylic acid, 1-methylethylene-1.2-dicarboxylic acid and 1.2-dichloroethylene-1.2-dicarboxylic acid, each of $y$ and $y'$ represents a member selected from the group consisting of hydrogen and chlorine, and each of $z$ and $z'$ represents a member selected from the group consisting of hydrogen, fluorine, chlorine and bromine, when $y$ and $y'$ stand for hydrogen, and represents a member selected from the group consisting of hydrogen and chlorine, when $y$ and $y'$ stand for chlorine, the radical —NH—$x$—HN— connecting the nuclei A and A' in α-positions, is added to the mass of the said material and the thus-colored material is converted into the final form.

2. The process for mass pigmenting filaments, molded goods and cast sheets made with a material selected from the group consisting of synthetic polymers, copolymers and polycondensates wherein the anthraquinone dyestuff of the formula

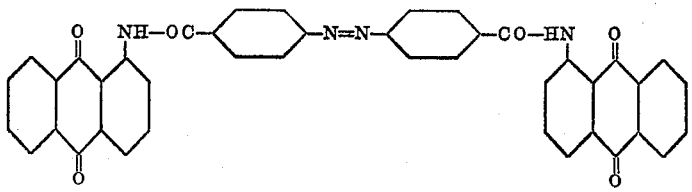

is added to the mass of the said material and the thus-colored material is converted into the final form.

3. The process for mass pigmenting filaments, molded goods and cast sheets made with a material selected from the group consisting of synthetic polymers, copolymers and polycondensates wherein the anthraquinone dyestuff of the formula

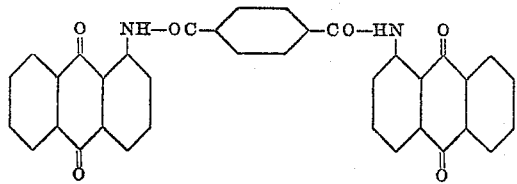

is added to the mass of the said material and the thus-colored material is converted into the final form.

4. The process for mass pigmenting filaments, molded goods and cast sheets made with a material selected from the group consisting of synthetic polymers, copolymers and polycondensates wherein the anthraquinone dyestuff of the formula

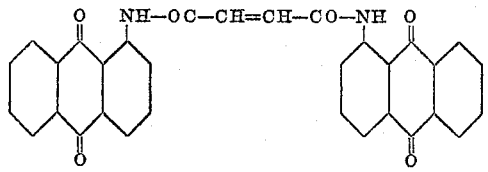

is added to the mass of the said material and the thus-colored material is converted into the final form.

5. The process for mass pigmenting filaments, molded goods and cast sheets made with a material selected from the group consisting of synthetic polymers and copolymers wherein the anthraquinone dyestuff of the formula

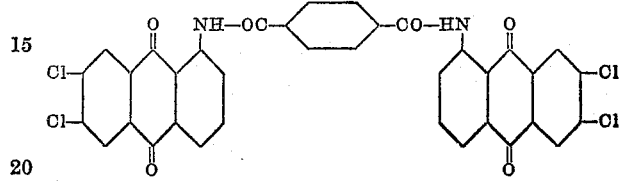

is added to the mass of the said material and the thus-colored material is converted into the final form.

6. The process for mass pigmenting filaments, molded goods and cast sheets made with a material selected from the group consisting of synthetic polymers and copolymers wherein the anthraquinone dyestuff of the formula

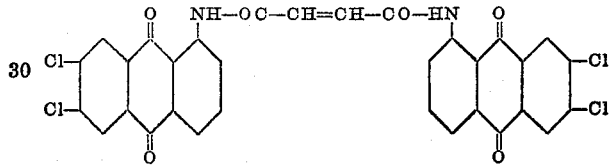

is added to the mass of the said material and the thus-colored material is converted into the final form.

References Cited in the file of this patent
UNITED STATES PATENTS

| | | |
|---|---|---|
| 1,891,520 | Bowley | Dec. 20, 1932 |
| 1,976,363 | Northrup | Oct. 9, 1934 |
| 2,508,814 | Coffey | May 23, 1950 |
| 2,555,713 | Sutter | June 5, 1951 |
| 2,558,992 | Stott | July 3, 1951 |
| 2,709,168 | Jenny | May 24, 1955 |
| 2,914,542 | Randall | Nov. 24, 1959 |